Feb. 17, 1953   E. C. FORSYTHE   2,628,437
ANTISLIP DEVICE
Filed Aug. 19, 1949   2 SHEETS—SHEET 1
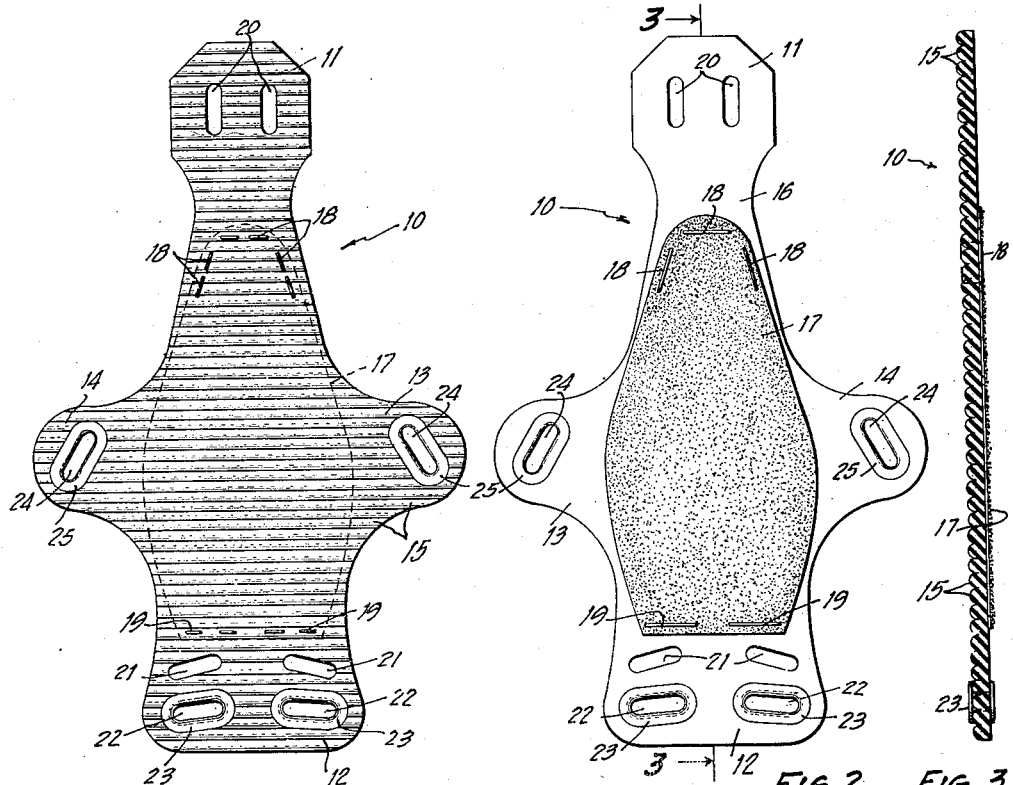
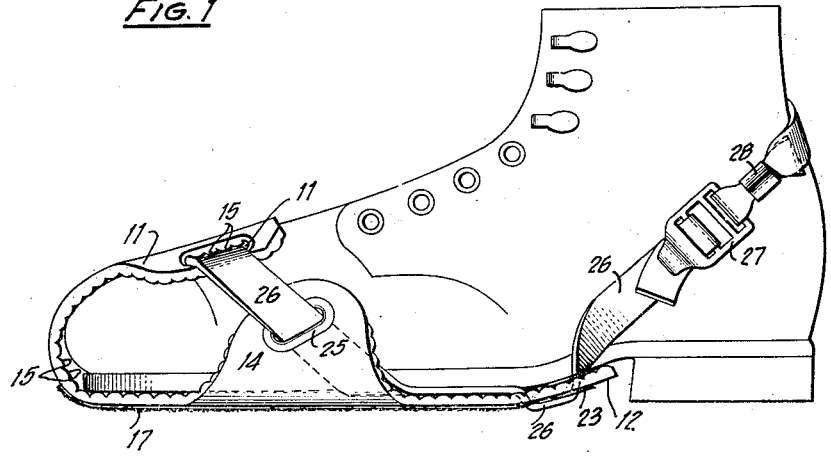
Inventor:
Edwin C. Forsythe
by *His Attorneys.*

Feb. 17, 1953  E. C. FORSYTHE  2,628,437
ANTISLIP DEVICE
Filed Aug. 19, 1949  2 SHEETS—SHEET 2
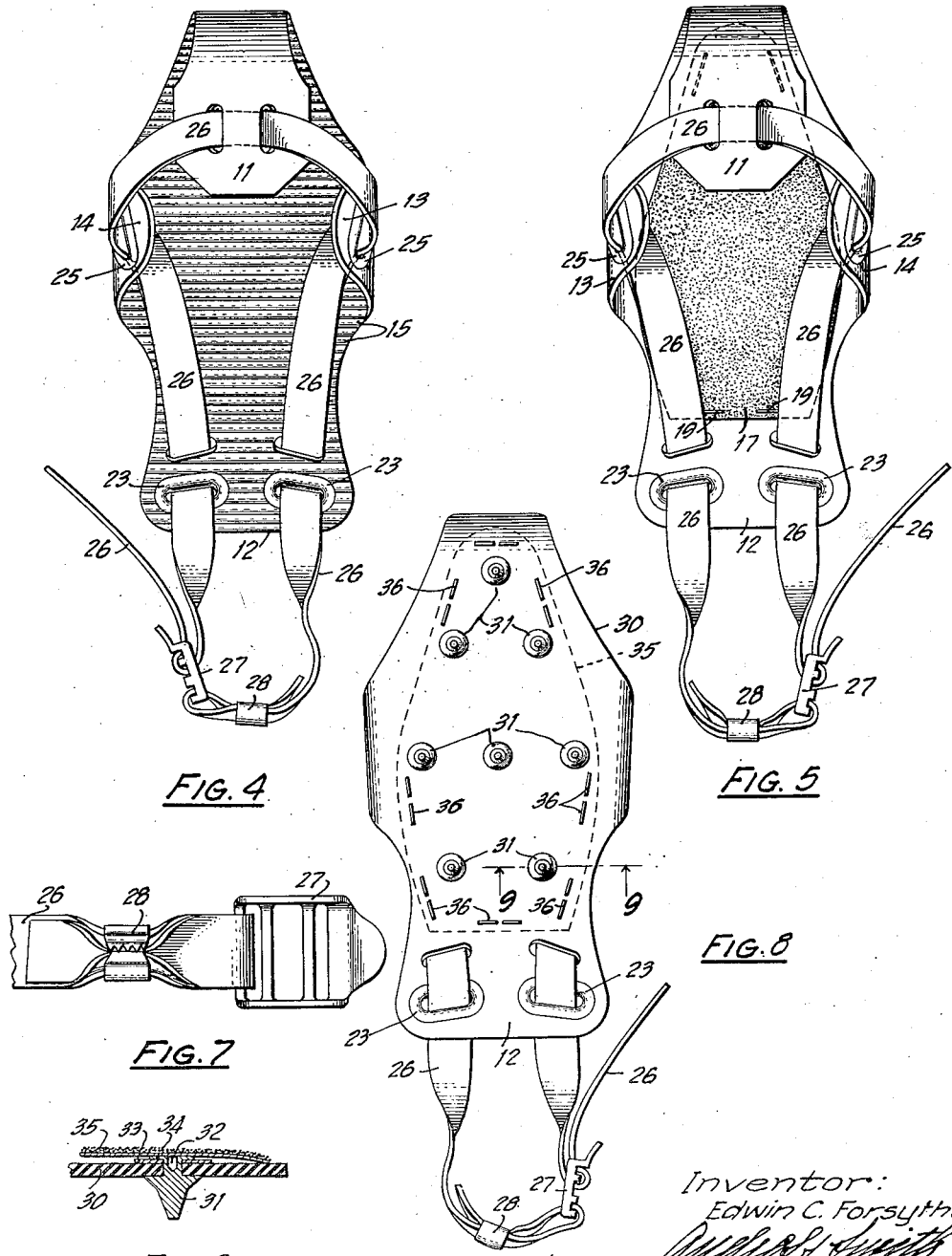
Inventor:
Edwin C. Forsythe
by
His Attorneys.

Patented Feb. 17, 1953

2,628,437

UNITED STATES PATENT OFFICE 2,628,437

ANTISLIP DEVICE

Edwin C. Forsythe, Schenectady, N. Y.

Application August 19, 1949, Serial No. 111,187

5 Claims. (Cl. 36—7.7)

1

This invention relates to anti-slip devices, having particular reference to such devices adapted for use in conjunction with footwear to prevent slipping on slippery, polished or inclined surfaces.

An object of the invention is to provide such a device which is inexpensive, readily attached to a shoe, or the foot, and which is particularly adaptable for industrial use when treading on wet or greasy floors, ramps, platforms, scaffolds, and icy and snow-packed walks and streets where falls are most likely to occur.

Another object of the invention is to provide such a device which is adapted to be detachably secured to any type of footwear, or even to the bare foot, and which comprises an inexpensive replaceable element provided with a ground-engaging surface having a high coefficient of friction, whereby said element, when worn out, readily may be replaced.

Another object of the invention is to provide such a device which is reversible in that one side thereof has resilient or flexible gripping projections or extensions thereon which will not mar or scratch highly polished floors or similar surfaces; and the other side of which has rigid projections adapted frictionally to engage other surfaces where there is no need for concern as to the danger of any damage occurring.

Another object of the invention is to provide such a device having elongated projections or calks thereon adapting the same for attachment to a shoe so that such a device can be used for treading upon soft surfaces, such as grass, whereby the device can be used for golfing, baseball and other sports.

Other objects of the invention will in part be obvious and will in part appear hereinafter.

The invention accordingly comprises an anti-slip attachment for shoes possessing the features, properties, and the relation of elements which will be exemplified in the device hereinafter described and the scope of the application of which will be indicated in the claims.

For a fuller understanding of the nature and objects of the invention, reference should be had to the following detailed description taken in connection with the accompanying drawings, in which:

Fig. 1 is a plan view of a blank of flexible material embodying a preferred form of the invention, depicting a flexible resilient gripping surface on one side thereof;

Fig. 2 is a view similar to Fig. 1 showing the opposite side thereof provided with a member having rigid gripping projections thereon;

Fig. 3 is a sectional view taken along the line 3—3 of Fig. 2;

Fig. 4 is a view of the blank depicted in Fig. 1 provided with means securing the projecting end portions, or wing members, together and showing the device ready for application to a shoe;

Fig. 5 is a view similar to Fig. 4 showing the

2 device of Fig. 2 provided with the same means for securing the projecting end portions, or wing members, together for application to a shoe and illustrating the reversible nature of the device;

Fig. 6 is a side elevational view of the device, for example, that shown in Figs. 1 and 2, secured in position with the rigid ground-gripping surface exposed for use;

Fig. 7 is a detail view, somewhat enlarged, and with a portion broken away, illustrating a clamping member for securing the holding means to a fastening element;

Fig. 8 is a bottom view of an anti-slip device illustrating a modified form of the invention; and Fig. 9 is a sectional detail view, somewhat enlarged, taken along the lines 9—9 of Fig. 8.

Referring more particularly to the drawing, there is indicated generally at 10 (Figs. 1 and 2) a blank of flexible material constituting the body or carrier of the anti-slip device. Such a blank may be either die cut from sheet material or may be molded into the configuration shown. Preferably, this blank is made from rubber sheet material, or rubberized material, reinforced centrally thereof by a fabric.

The blank has a forwardly projecting portion, or wing 11, and a rearwardly projecting portion, or wing 12. Lateral wings or projections 13 and 14 extend from opposite sides of the central portion thereof.

As shown in Fig. 1, the surface of the blank is provided with resilient surface-gripping extensions in the form of cleats, spaced parallel ribs or corrugations 15. The opposite side 16 of the blank preferably is smooth surfaced.

Secured to the smooth surfaced side 16 (Fig. 2) is a flexible sheet of material 17 which preferably comprises a coarse-grained sheet of abrasive material providing rigid projections adapted to grip surfaces to be tread upon. It will be understood that the abrasive material can directly be embedded into the smooth surface 16 of the blank 10 but I prefer to use a sheet of material such as that shown which conforms in area approximately to the area of the sole of a shoe and extends somewhat therebeyond in order that such a strip may be removed therefrom when it becomes worn. The sheet 17 preferably is first adhesively secured to the smooth side 16 of the blank 10 by means of an adhesive which is compatible therewith. At the forepart of the strip, staples 18 preferably also are used and similar staples 19 are utilized at the rear or shank portion thereof in order more securely to fasten the strip 17 to the blank 10.

The wing member or projection 11 is provided with eyelets or openings 20, and the projection or wing member 12 is similarly provided with eyelets 21 and 22, the latter preferably being reinforced by grommets 23. The lateral wings 14 and 15 are similarly provided with eyelets 24, which also preferably are reinforced by grommets 25.

From the foregoing description, it will be seen that there is provided a blank for a reversible anti-slip device adapted for attachment to a shoe in which there is present a plurality of resilient extensions 15 which are adapted flexibly and frictionally to engage particular surfaces such as polished floors and the like where it is desired that such surfaces be not marred thereby when the blank is strapped to a shoe. At the same time, the rigid gripping surface provided by the flexible, abrasive-covered sheet 17 will tend frictionally to engage the sole of the shoe of the wearer of such a device and prevent relative slippage between the shoe and the device because of the high coefficient of friction which is provided by such an abrasive surface.

The blank shown in Figs. 1 to 3 has exceptional utility because of the fact that the same is reversible for double purpose use. That is to say, where it is desired to use the device on smooth surfaces which are intended to be kept free from damage, that surface having the corrugated ribs 15 can be employed as above described. On the other hand, where it is intended to use the device on surfaces, such as cement floors, or the like, which are covered by grease, water, ice, snow, etc., the same is secured to the foot, or a shoe, with the coarse-grained, rigid, abrasive surfaces outwardly extending. When the device is reversibly applied in this manner, the corrugated resilient surface will also frictionally engage the bottom of the shoe to prevent relative slippage between the device and the shoe.

It will be understood that it is intended to provide blanks of such configuration for use in anti-slipping devices which are not always adapted for reversible use. In other words, a blank such as that shown in Fig. 1 may be employed without the flexible strip 17. On the other hand, a blank which is smooth on both surfaces and merely has a flexible strip such as that shown at 17 in Fig. 2, secured along one surface is well adapted for ground-engaging use. Therefore, Figs. 1 and 2 are intended to illustrate the reversible as well as the non-reversible blank contemplated by the invention.

The wings 14 and 15 also aid in securely holding the device to the shoe because they are adapted to extend upwardly along the sole edge to overlie the sides of the forepart of the shoe where they can be securely connected together as will hereinafter be described. The wing or projection 11 is also adapted to fold over the toe counter or forepart of the shoe to prevent forward movement of the shoe. This wing member can also be connected to the wings 14 and 15 when securing the device to a shoe.

The securing means preferably is also of a resilient material, such as a single rubber strand or strap 26 which is threaded through the grommet-reinforced eyelet 22, through the eyelet 23, along the surface of the blank which is adapted to engage the shoe sole, then through the grommet-reinforced eyelet 24, in the wing 15, the eyelets 20 in the wing 11, the grommet-reinforced eyelet 24 in the wing 14, along the surface of the blank adapted to engage the shoe sole, and then through the eyelet 21 and grommet-reinforced eyelet 22 in the wing or projection 12 which constitutes the shank portion of the blank. One end of the securing means 26 is passed through a suitable buckle or fastening member 27, folded over upon itself and secured thereto by a metal clasp 28, the ends of which are serrated and interlockingly engage each other, holding the end portions of the strap together in such a manner that they cannot tear loose or slip. The other end of the strap 26 is passed through the other portion of the buckle 27 in such a manner that it frictionally engages the same to be held in adjustably secured position.

It will be observed that the staples 18 are illustrated as being secured to the carrier or blank in such a manner that they are out of contact with the ground to prevent wear and tear thereon. In a shoe such as that shown in Fig. 6, which depicts an industrial work shoe, the shank portions are such that the rear staples holding the flexible sheet 17 are fairly close to the ground but, nevertheless, they do not touch the same in such a way that any appreciable wear or tear will occur. On different types of shoes, and different sizes of anti-slip devices, the staples or other equivalent means are so positioned that normally they are adapted to be out of contact with the ground.

The reversible nature of the device shown in the drawings is such that it can quickly be changed so that either the flexible or resilient gripping means provided by the corrugations 15 can be utilized. Or the rigid gripping means provided by the abrasive particles can be employed, merely by turning the wings 11, 14 and 15 in opposite directions, and replacing the strap 26 in such a manner that lateral portions of the latter fall between the surface of the blank contacting the shoe sole. The weight of the wearer of the shoe pressing against these portions of the strap 26 between the shoe and the blank tend additionally to secure the strap rigidly and firmly in position.

The modified form of the invention shown in Fig. 8 of the drawing depicts an anti-slip device particularly adapted, for example, for golf use. In such instance, the blank or carrier 30 can be smooth surfaced on both sides similar to the arrangement described above where it is intended to use only an abrasive sheet. The configuration of the blank or carrier is the same as that described in connection with Figs. 1 and 2 but the exposed gripping surface is provided with a plurality of calks 31 formed of any suitable material, preferably metal. These calks may have a shank portion 32 which is split and penetrates the blank so that a washer 33 can be placed thereover and the head of the split shank portion riveted over against the washer as at 34 in the manner in which a split rivet is secured in position. In order to insure further freedom from relative slippage between the sole of the shoe to which such a device is secured a strip of flexible material 35 coated with an abrasive substance, similar to that described in connection with Figs. 1 and 2, may be employed. This strip of material can be secured in position by staples 36, or other equivalent means. A securing member or strap 26, similar to that above described, may also be employed to secure this device in position on a shoe.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In an anti-slip device adapted for attachment to a shoe, the improvement comprising a blank of flexible material provided with a plurality of calks interlockingly secured to one side thereof and adapted grippingly to engage a surface to be tread upon, and a sheet of flexible material, having embedded along its surface a coating of abrasive material, secured to said blank on the side thereof opposite said calks; whereby frictionally to engage the sole of said shoe to prevent relative slippage between the same and said blank.

2. An anti-slip device adapted for attachment to a shoe; said device comprising a blank of flexible sheet material having a main body portion of a size and shape adapted to overlie and substantially cover that portion of the sole of a shoe which normally contacts the surface being walked upon; said blank having an upwardly and rearwardly turned extension at the front end thereof adapted to overlie the toe of said shoe, an extension at the rear thereof adapted to overlie at least part of the arched portion of said sole and be normally out of contact with said surface, and oppositely disposed upturned wing portions adapted to overlie portions of the opposite sides of said shoe intermediate the toe and arch thereof; said extensions and wing portions being provided with eyelets therein; and a single strap extending through said eyelets and of a length adapting it to extend around the upper portion of the back of said shoe for securing said device thereto; the main body portion of said device being provided on the opposite sides thereof with means adapted frictionally to engage the surface being walked upon and the surface of the sole of said shoe, respectively; whereby to prevent relative slippage of said device and said surfaces in contact therewith.

3. The structure set forth in claim 2 in which the slippage preventing means on one side of said main body portion is a hard, rigid means, and the slippage preventing means on the other side thereof is a yielding resilient means; said device being reversible to bring either of said slippage preventing means in contact with the surface being walked upon by merely removing said strap, turning said front extension and said wing portions in the opposite directions and replacing said strap.

4. An anti-slip device adapted for attachment to a shoe; said device comprising a blank of flexible rubber having corrugations in one side thereof and a main body portion of a size and shape adapted to overlie and substantially cover that portion of the sole of a shoe which normally contacts the surface being walked upon; said blank having an extension at the front end thereof of a length adapting it to be upwardly and rearwardly turned to overlie the toe of said shoe, an extension at the rear thereof adapted to overlie at least a part of the arched portion of said sole and be normally out of contact with said surface, and oppositely disposed lateral wing portions extending outwardly from said main body portion adapted to be turned upwardly and embrace portions of the sides of said shoe therebetween; a sheet of flexible material coated on one side with a coarse, granular, abrasive substance and having a portion substantially coextensive with said main body portion of said blank; means detachably securing said coated sheet with the abrasive side thereof exposed, to the uncorrugated side of said blank in those portions of said blank which are normally out of contact with the surface walked upon, whereby said securing means will not be subjected to undue wear, and said coated sheet may be readily replaced when worn; said extensions and said wing portions being provided with eyelets adapted to have a single strap passed therethrough for holding said front extension and said wings in upturned position and securing said device to said shoe with either the corrugated side or the abrasive coated side exposed.

5. An anti-slip device adapted for attachment to a shoe; said device comprising a unitary blank of flexible rubber provided with corrugations on one side thereof, and comprising a main body portion of a size and shape adapted to overlie and substantially cover that portion of the sole of a shoe which normally contacts the surface being walked upon; said body portion having an extension at the front end thereof adapted to be flexed upwardly and rearwardly or downwardly and rearwardly, depending upon which side of said blank is to lie in contact with the sole of said shoe, and to overlie the toe of said shoe, an extension at the rear thereof adapted to overlie at least part of the arched portion of said sole and be normally out of contact with said surface, and a pair of oppositely disposed, lateral wing portions extending outwardly from said body portion and adapted to be flexed to lie against opposite sides of said shoe adjacent the sole thereof; a sheet of flexible material, having one side thereof coated with abrasive particles, and of a size and shape adapted substantially to cover the main body portion of said blank, and means detachably securing said sheet to the uncorrugated side of said body portion with the abrasive particles thereon exposed; said extensions and said wing portions being provided with eyelets; whereby said device may be attached to said shoe with said corrugated side of said blank exposed or with said abrasive particles exposed, by means of a single strap extending through said eyelets and around the upper portion of the back of said shoe.

EDWIN C. FORSYTHE.

REFERENCES CITED

The following references are of record in the file of this patent:

UNITED STATES PATENTS

| Number | Name | Date |
|---|---|---|
| 8,053 | Stearns | Apr. 22, 1851 |
| 44,961 | Landfear | Nov. 8, 1864 |
| 322,224 | Watkinson | July 14, 1885 |
| 472,214 | Hall | Apr. 5, 1892 |
| 1,024,981 | Findlay | Apr. 30, 1912 |
| 1,195,866 | Stephan | Aug. 22, 1916 |
| 1,796,399 | Roodhouse | Mar. 17, 1931 |
| 1,980,621 | Innis | Nov. 13, 1934 |
| 2,110,839 | Ferriot | Mar. 8, 1938 |
| 2,193,943 | Shea | Mar. 19, 1940 |
| 2,260,037 | Lazarus | Oct. 21, 1941 |
| 2,426,524 | Rosenberg | Aug. 26, 1947 |

FOREIGN PATENTS

| Number | Country | Date |
|---|---|---|
| 110,731 | Switzerland | Aug. 1, 1925 |